United States Patent [19]
Elkins

[11] 3,834,737
[45] Sept. 10, 1974

[54] DEVICE FOR TOWING ONE VEHICLE WITH ANOTHER

[75] Inventor: Edward John Elkins, Concord, Calif.

[73] Assignee: Valley Tow-Rite, a division of Scott & Fetzer Co., Lodi, Calif.

[22] Filed: Mar. 19, 1973

[21] Appl. No.: 342,644

[52] U.S. Cl. .............................. 280/502, 280/491
[51] Int. Cl. ............................................. B60d 1/14
[58] Field of Search .......... 280/481, 483, 491, 493, 280/500, 502

[56] References Cited
UNITED STATES PATENTS

| | | | |
|---|---|---|---|
| 2,887,325 | 5/1959 | Warren | 280/502 |
| 3,119,631 | 1/1964 | Wanamaker | 280/502 X |
| 3,649,049 | 3/1972 | Woodke | 280/491 E |

*Primary Examiner*—Leo Friaglia
*Assistant Examiner*—Randall A. Schrecengost
*Attorney, Agent, or Firm*—Townsend and Townsend

[57] ABSTRACT

A tow device having a rigid transverse frame capable of limited internal flexing motion and attachable to a towing vehicle is disclosed. A first foot is disposed at one side of the transverse frame and a second foot is disposed at the opposite side of the transverse frame, each foot abuttable against the bumper of the vehicle to be towed. Chain guides are provided on the underside of each foot. Two chains are provided which attach to the frame of the vehicle to be towed, one chain passable through the chain guide on the underside of the first foot and the second chain passage through the chain guide on the underside of the second foot to attach to the transverse frame. Means are provided for tensioning the chains so that the first and the second feet are pressed against the bumper of the vehicle to be towed.

7 Claims, 1 Drawing Figure

PATENTED SEP 10 1974　　　　　　　　　　3,834,737
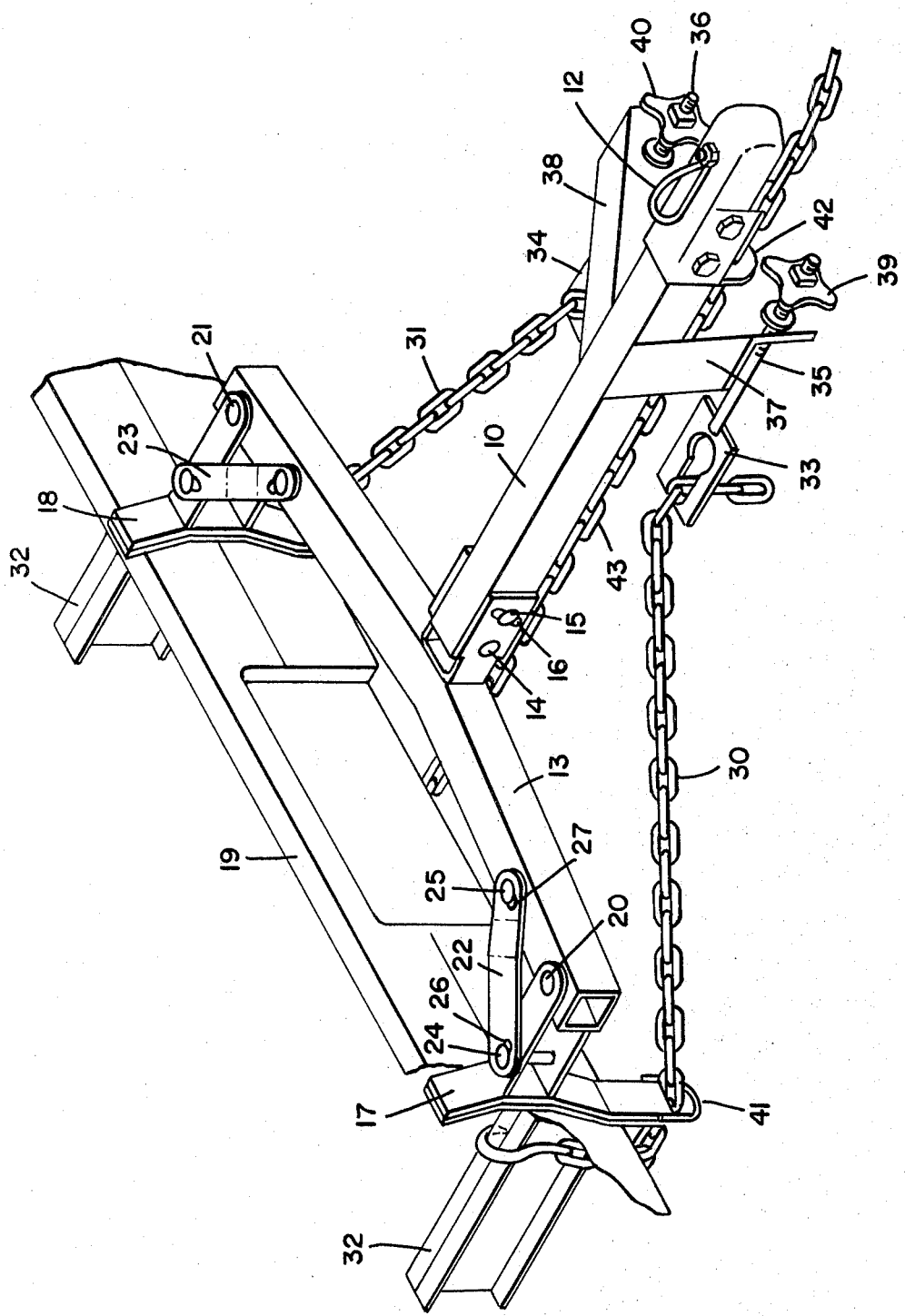

DEVICE FOR TOWING ONE VEHICLE WITH ANOTHER

BACKGROUND OF THE INVENTION

1. Field of the Invention

The invention relates to tow devices, and in particular to devices for towing automobiles and other vehicles.

2. Description of the Prior Art

A variety of different types of devices have been designed whereby one vehicle can be towed by another. However, these devices have been quite cumbersome, making them very difficult to install, and are crudely constructed of rigidly attached members. A rigid tow device does not provide the flexible connection between towing vehicles required to prevent damage to the towed vehicle during operation over rough roads or while cornering.

The present invention provides a tow device with semi-flexible connections between the principal members thereof. The semi-flexible connections allow the two device to "triangulate" to allow for movement of the towed vehicle relative to the towing vehicle. This alleviates stresses exerted on either vehicle by relative movement therebetween, so that neither vehicle is damaged.

The tow device is relatively light weight, and is easily attachable to the towed vehicle by a single person. This is valuable not only in the ease with which the initial connection can be made, but also permits adjustment of the device while it is being used, so that a single person would not be stranded on the road if part of the tow device were to work loose.

The tow device is attachable to the vehicle to be towed by means of two chains attached to opposite sides of the frame of the towed vehicle. In this manner, the vehicle is towed by connection to its strongest structural members, and stress is not exerted on exterior portions of the car such as the bumper. The provision of towing points on both sides of the car provides for uniform tension on each side of the towed vehicle during straight towing. During turns one chain is used for towing while the other slackens, and the tow device "triangulates" so that the tow device remains in full contact with the towed vehicle.

SUMMARY OF THE INVENTION

The invention relates to a tow device having a longitudinal member connectable to a tow vehicle and a transverse member attached at the center thereof to the longitudinal member. The attachment is made in such a manner as to allow slight pivotal motion of the transverse member relative to the longitudinal member about an axis parallel to the longitudinal axis of the transverse member. A first and a second rotatable foot are provided, the first foot disposed at one end of the transverse member and connected thereto, and the second foot disposed at the opposite end of the transverse member and connected thereto. Each foot is abuttable against the bumper of a vehicle to be towed, and each foot has a chain guide on the underside thereof. Means are provided for restricting the rotation of the rotatable feet. A first and a second chain are provided, each chain attachable to the frame of the vehicle to be towed and connected to the longitudinal member. The first chain is passable through the chain guide on the underside of the first foot and the second chain is passable through the chain guide on the underside of the second foot, and means are provided for tensioning the chains.

The novel features which are believed to be characteristic of the invention, both as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

The FIGURE is a perspective view of the tow device attached to the vehicle to be towed, with part of the bumper cut away to illustrate the attachment to the frame of the towed vehicle.

DESCRIPTION OF THE PREFERRED EMBODIMENT

As illustrated by reference to the FIGURE, a longitudinal member 10 is attachable to a towing vehicle (not shown) by means of a coupler 11 and is fixable thereto by means of winder 12. A transverse member 13 is connected at the center of the transverse member to the longitudinal member 10 by means of pins 14 and 15. The transverse member 13 is pivotable about pin 14, but the pivotal motion is restricted by pin 15 which is engageable with the longitudinal member 13 by a slot 16. Hence, the transverse member 13 is slightly pivotable relative to the longitudinal member 12 about an axis parallel to the longitudinal axis of the transverse member 13. In this manner, a transverse frame is provided including the transverse and longitudinal members which is substantially rigid but capable of limited internal flexing motion.

The transverse member 13 can be slightly angular, with an apex at the center of the transverse member where it is attached to the longitudinal member 10. Rotatable feet 17 and 18 are disposed at each end of the transverse member 13, and are adapted to be abuttable against a bumper 19 of a vehicle to be towed. The feet 17 and 18 are attached to the transverse member 13 by means of pin connections 20 and 21 so that the feet are rotatable with respect to the transverse member. However, bars 22 and 23 are provided which restrict the rotation of the rotatable feet. The bar 22 is attached to the foot 17 and to the transverse member 13 intermediate the pin connection 20 of the foot 17 to the transverse member 13 and the center of the transverse member. The bar 22 is attached to the foot 17 and the transverse member 13 by means of pins 24 and 25 engageable with slots 26 and 27 on the bar which provide for semi-fixable engagement of the bar 22 with the foot 17 and the transverse member 13. The bar 23 is similarly attached to the foot 18 and the transverse member 13.

The vehicle to be towed is pulled by means of chains 30 and 31 attached to the frame 32 of the vehicle to be towed. Chains 30 and 31 are engageable with slots 33 and 34 which are attached to bolts 35 and 36. The bolts 35 and 36 pass through apertures through rigid members 37 and 38 attached to the longitudinal member 10.

Star nuts 39 and 40 are threadably engageable with bolts 35 and 36 whereby the chains 30 and 31 can be tensioned.

The chains 30 and 31 are maintained in position by passing them through chain guides attached to the feet 17 and 18. One chain guide 41 is illustrated, but the chain guide on the underside of foot 18 is hidden in the perspective view shown. A chain guide 42 can be located on the underside of the longitudinal member 10 to provide support for a safety chain 43. The chain guides provided by the present invention restrict the freedom of movement of the chains, and prevent them from slapping against the towing vehicle, the vehicle to be towed or the ground.

In operation, the vehicle to be towed is pulled equally by chains 30 and 31 when towed in a straight line. The feet 17 and 18 are maintained in contact with the bumper 19 of the vehicle to be towed by means of the tension on the chains. Hence, if the towing vehicle stops or slows down, the towed vehicle does not ram the towing vehicle. In operation over a rough road, up and down motion of the towed vehicle relative to the towing vehicle is accommodated by means of pivotal motion of the transverse member 13 relative to the longitudinal member 10. On turns or on rough roads when the towed vehicle moves laterally with respect to the towing vehicle, the feet 17 and 18 rotate slightly about pins 20 and 21 so that they are maintainable in abutment with the bumper 19 of the vehicle to be towed. During turns, the outside chain pulls the towed vehicle while the inside chain slackens. The towing device effectively "triangulates" to compensate for relative motion of the towing vehicle and the towed vehicle so that the feet 17 and 18 are maintained in abutment with the bumper 19 of the towed vehicle.

What I claim as new is:

1. A device for towing one vehicle with another comprising:
   a substantially rigid transverse frame attachable to a towing vehicle;
   a first and a second rotatable foot, the first foot disposed at one side of the transverse frame and connected thereto and the second foot disposed at the opposite side of the transverse frame and connected thereto, each foot abuttable against the bumper of the vehicle to be towed and rackable relative to said bumper and rotatable about a substantially vertical axis at the connection of the said foot to the frame so that each said foot remains in abutment with the bumper of the vehicle to be towed during turning of the towing vehicle;
   means for restricting rotation of each of the rotatable feet to a preselected arc; and
   means for connecting the transverse frame to the frame of the vehicle to be towed.

2. A device as recited in claim 1 wherein the transverse frame comprises a longitudinal member and a transverse member attached at the center thereof to the longitudinal member, said transverse member being pivotably attached to the longitudinal member in such a manner as to allow slight pivotal motion of the transverse member relative to the longitudinal member about an axis parallel to the longitudinal axis of the transverse member so that the transverse frame is capable of limited internal flexing motion.

3. A device for towing one vehicle with another comprising:
   a longitudinal member attachable to a towing vehicle;
   a transverse member attached at the center thereof to the longitudinal member in such a manner as to allow slight pivotal motion of the transverse member relative to the longitudinal member about an axis parallel to the longitudinal axis of the transverse member;
   a first and a second rotatable foot, the first foot disposed at one end of the transverse member and connected thereto and the second foot disposed at the opposite end of the transverse member and connected thereto, each foot abuttable against the bumper of the vehicle to be towed, each said foot having a chain guide on the underside thereof;
   means for restricting the rotation of each rotatably foot;
   a first and second chain, each chain attachable to the frame of the vehicle to be towed and connected to the longitudinal member, the first chain passable through the chain guide on the underside of the first foot and the second chain passable through the chain guide on the underside of the second foot; and
   means for tensioning the chains so that the first and the second feet are pressed against the bumper of the vehicle to be towed.

4. A device as recited in claim 3 wherein the means for restricting the rotation of the rotatable feet comprises a first bar having one end in semi-fixable engagement with the first foot and having an opposite end in semi-fixable engagement with the transverse member intermediate the connection of said first foot with said transverse member and the center of the transverse member, to provide slight rotation of said first foot relative to said transverse member; and a second bar having one end in semi-fixable engagement with the second foot and having an opposite end in semi-fixable engagement with the transverse member intermediate the connection of said second foot with said transverse member and the center of the transverse member, to provide slight rotation of said second foot relative to said transverse member.

5. A device as recited in claim 3 wherein the means for tensioning the chains comprises a first slot engageable with the first chain, a first rigid member attached to the longitudinal member and having an aperture therethrough, a first bolt attached to the first slot and passable through the aperture through the first rigid member, and a first star nut threadibly engageable with the first bolt whereby the first chain is tensionable; and a second slot engageable with the second chain, a second rigid member attached to the longitudinal member and having an aperture therethrough, a second bolt attached to the second slot and passable through the aperture through the second rigid member, and a second star nut threadibly engageable with the second bolt whereby the second chain is tensionable.

6. A device as recited in claim 3, and additionally comprising a chain guide on the underside of the longitudinal member and a safety chain passable through the chain guide on the underside of the longitudinal member and connectable at one end to the tow vehicle and at the opposite end to the vehicle to be towed.

7. A device as recited in claim 3, wherein the transverse member has two equal length sides joined slightly angularly at the center of said transverse member to form an apex in said transverse member directed toward the towing vehicle.

* * * * *